United States Patent
Takahashi

(10) Patent No.: US 7,436,619 B2
(45) Date of Patent: Oct. 14, 2008

(54) HEAD FLOATING AMOUNT CONTROL METHOD AND UNIT, STORAGE APPARATUS AND COMPUTER-READABLE PROGRAM

(75) Inventor: Tsuyoshi Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/522,675

(22) Filed: Sep. 18, 2006

(65) Prior Publication Data

US 2007/0268608 A1    Nov. 22, 2007

(30) Foreign Application Priority Data

May 19, 2006    (JP)    ............... 2006-140450

(51) Int. Cl.
*G11B 21/02*    (2006.01)
*G11B 27/36*    (2006.01)
*G11B 5/02*    (2006.01)

(52) U.S. Cl. .............................. 360/75; 360/31; 360/25

(58) Field of Classification Search ........................ None
See application file for complete search history.

(56) References Cited

U.S. PATENT DOCUMENTS

| 5,880,899 | A | 3/1999 | Blachek et al. | ............... | 360/66 |
|---|---|---|---|---|---|
| 6,754,018 | B2 | 6/2004 | Takahashi et al. | ............. | 360/53 |
| 2003/0099054 | A1 | 5/2003 | Kamijima | ..................... | 360/59 |
| 2003/0174430 | A1 | 9/2003 | Takahashi et al. | ............. | 360/75 |
| 2007/0030593 | A1* | 2/2007 | Hiroyuki et al. | ............ | 360/128 |
| 2007/0171563 | A1* | 7/2007 | Pit | .............................. | 360/75 |
| 2007/0195449 | A1* | 8/2007 | Feist et al. | ...................... | 360/75 |
| 2007/0201159 | A1* | 8/2007 | Ryu | ............................ | 360/75 |

FOREIGN PATENT DOCUMENTS

| JP | 10-241333 | 9/1998 |
|---|---|---|
| JP | 11-185210 | 7/1999 |
| JP | 2003-168274 | 6/2003 |
| JP | 2003-272335 | 9/2003 |
| JP | 2005-071546 | 3/2005 |
| JP | 2006-004474 | 1/2006 |
| JP | 2006-018987 | 1/2006 |

\* cited by examiner

*Primary Examiner*—Andrew L. Sniezek
(74) *Attorney, Agent, or Firm*—Greer, Burns & Crain, Ltd.

(57) ABSTRACT

A head floating amount control unit control a head floating amount of each of a plurality of heads respectively having a heater, with respect to a recording medium, by detecting contact between each head and a corresponding recording medium by detecting a thermal asperity or a read error, and judging a heating amount of the heater at a time when the contact is detected as a state where the head floating amount is zero, and controlling the head floating amount of each head to an optimum head floating amount based on a relationship of the heating amount of the heater and an amount of thermal expansion of each head.

20 Claims, 16 Drawing Sheets

FIG.14

| | ZONE 0 | ZONE 1 | ZONE 2 | ZONE 3 | ZONE 4 | . | . | . | . | . | . | . | . | ZONE m |
|---|---|---|---|---|---|---|---|---|---|---|---|---|---|---|
| HEAD NO. 0 | α 00 | α 01 | α 02 | α 03 | α 04 | . | . | . | . | . | . | . | . | α 0m |
| HEAD NO. 1 | α 10 | α 11 | α 12 | α 13 | α 14 | . | . | . | . | . | . | . | . | α 1m |
| HEAD NO. 2 | α 20 | α 21 | α 22 | α 23 | α 24 | . | . | . | . | . | . | . | . | α 2m |
| . | . | . | . | . | | . | . | . | . | . | . | . | . | . |
| . | . | . | . | . | | . | . | . | . | . | . | . | . | . |
| . | . | . | . | . | | . | . | . | . | . | . | . | . | . |
| HEAD NO. n | α n0 | α n1 | α n2 | α n3 | α n4 | . | . | . | . | . | . | . | . | α nm |

FIG.15

|  | ZONE 0 | ZONE 1 | ZONE 2 | ZONE 3 | ZONE 4 | . | . | . | . | . | . | . | . | ZONE m |
|---|---|---|---|---|---|---|---|---|---|---|---|---|---|---|
| HEAD NO. 0 | A 00' | α 01' | α 02' | α 03' | α 04' | . | . | . | . | . | . | . | . | α 0m' |
| HEAD NO. 1 | α 10' | α 11' | α 12' | α 13' | α 14' | . | . | . | . | . | . | . | . | α 1m' |
| HEAD NO. 2 | α 20' | α 21' | α 22' | α 23' | α 24' | . | . | . | . | . | . | . | . | α 2m' |
| . | . | . | . | . | . | . | . | . | . | . | . | . | . | . |
| . | . | . | . | . | . | . | . | . | . | . | . | . | . | . |
| . | . | . | . | . | . | . | . | . | . | . | . | . | . | . |
| HEAD NO. n | α n0' | α n1' | α n2' | α n3' | α n4' | . | . | . | . | . | . | . | . | α nm' |

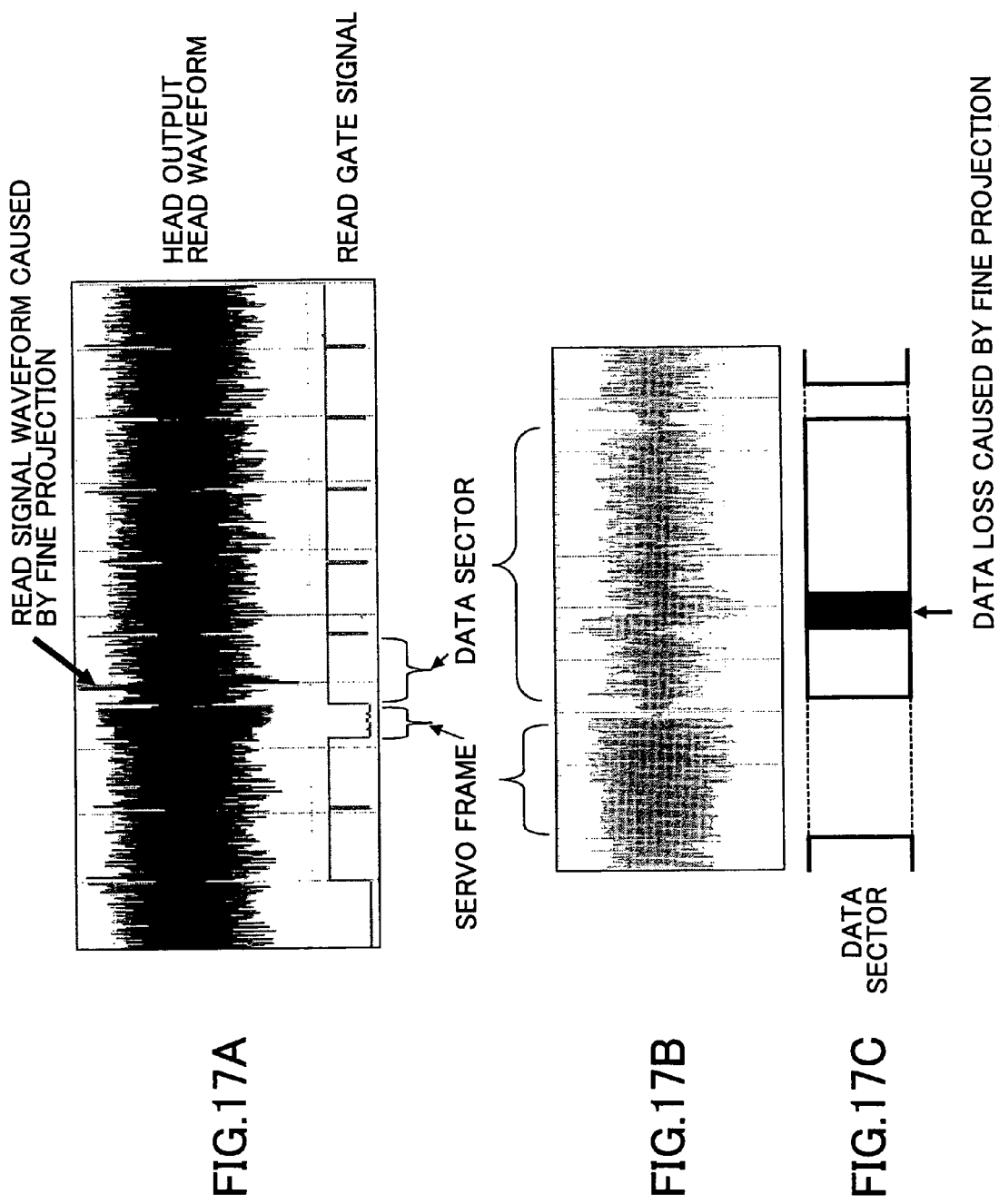

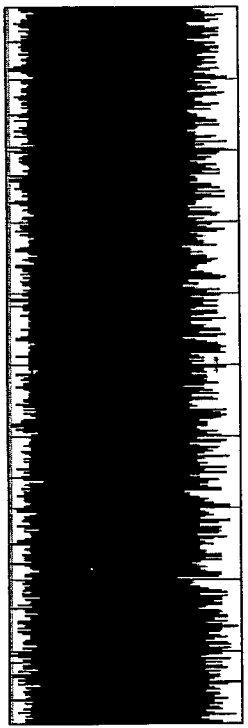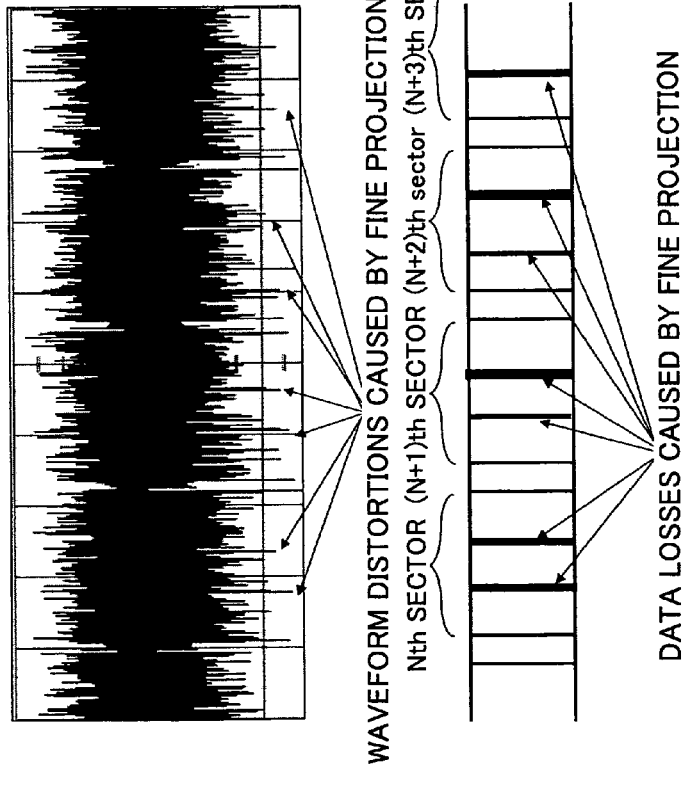
FIG.18A
FIG.18B
FIG.18C

HEAD FLOATING AMOUNT CONTROL METHOD AND UNIT, STORAGE APPARATUS AND COMPUTER-READABLE PROGRAM

BACKGROUND OF THE INVENTION

1. Field of the Invention

The present invention generally relates to head floating amount control methods and units, storage apparatuses and computer-readable programs, and more particularly to a head floating amount control method and a head floating amount control unit for controlling a floating amount of a head with respect to a recording medium, a storage apparatus which uses such a head floating amount control unit, and a computer-readable program which causes a computer to control the floating amount of the head by such a head floating amount control method. The present invention also relates to a computer-readable storage medium which stores such a computer-readable program.

2. Description of the Related Art

Storage apparatuses such as hard disk drives (HDDs) are used in various apparatuses such as desk-top personal computers, lap-top personal computers, servers, audio visual (AV) equipment, various kinds of portable electronic apparatuses including personal digital assistants (PDAs), and electronic apparatuses for automobiles including navigation apparatuses.

Due to the increase in the storage capacity of the HDDs, the recording density (surface density) of magnetic disks has increased, and the floating amount of the head with respect to the magnetic disk is becoming extremely small. In addition, in order to prevent damage to the head (or head crash) that is caused by head disk interference (HDI) generated due to the inconsistency or change in the head floating amount, improvements have been made to the head floating surface and the magnetic disk surface. The read performance, the write performance and the HDI reliability of the HDD are greatly affected by the change in the head floating amount, and a method has been proposed recently to control the head floating amount of the HDD by the HDD itself.

The floating amount of the head with respect to the magnetic disk accommodated within the HDD is controlled by a negative pressure generated between the head and the magnetic disk. The value of this negative pressure is approximately constant on an average depending on the shape of the head floating surface and the roughness of the magnetic disk surface, but is inconsistent among the individual heads and the corresponding magnetic disks. The effects of this inconsistency in the negative pressure on the read performance, the write performance and the margin until the head crash occurs are becoming larger as the recording density increases.

Accordingly, the floating amount of each of the heads within the HDD must be adjusted to a value such that the inconsistency among the floating amounts of the individual heads may be absorbed, and various proposals have been made to prevent the undesirable effects that are generated due to the change in the floating amount.

The floating characteristic of the conventional head is determined to fall within a range such that the inconsistency may be absorbed depending on the structure of the air bearing slider (ABS), the rotation windage loss at the radial position on the magnetic disk, the value of the negative pressure, the surface roughness of the magnetic disk and the like. For this reason, in a case where the inconsistency is large and particularly when the floating amount is small, the margin of the HDI with respect to the magnetic spacing deteriorates to thereby generate the possibility of the head crash.

On the other hand, when the floating amount is large, the efficiency of the electromagnetic conversion characteristic deteriorates due to the increase of the magnetic spacing. Consequently, there was a possibility of generating, to a certain extent, deterioration in the reproduced output, generation of the read error, and generation of the seek operation error caused by the read error with respect to the servo signal.

Furthermore, when the floating amount is small, there was a possibility of the head colliding with the projections on the surface of the magnetic disk. As a result, there was a possibility of generating the read error due to the thermal asperity or, causing damage to both the head and the magnetic disk due to the head colliding with the magnetic disk surface because of the repeated generation of the thermal asperity. Other than the thermal asperity, when the head floating surface makes contact with the magnetic disk surface, the lubricant coated on the magnetic disk surface may adhere to the head floating surface. In this case, the head crash may occur due to the change in the floating amount or the floating position of the head due to the damage caused by the contact between the head and the magnetic disk.

A method of controlling the thermal protrusion of the head floating surface with respect to the magnetic disk is proposed in a Japanese Laid-Open Patent Application No. 2005-71546, for example. A method of suppressing the thermal asperity by removing the projections on the magnetic disk surface is proposed in a Japanese Laid-Open Patent Application No. 10-241333, for example. Methods of controlling the floating amount of the head with respect to the disk by controlling heat generated by a heater that is built into the head are proposed in Japanese Laid-Open Patent Applications No. 2003-168274, No. 2003-272335, No. 2006-4474 and No. 2006-18987, for example. A method of detecting the thermal asperity is proposed in a Japanese Laid-Open Patent Application No. 11-185210, for example.

Therefore, conventionally, particularly when the inconsistency among the floating amounts of the individual heads is large, the margin with respect to the magnetic spacing of the HDI deteriorates if the floating amount is small, and there was a possibility of generating the head crash. In addition, if the floating amount is small, there was a possibility of the head colliding with the projections on the magnetic disk surface, to thereby generate the read error due to the thermal asperity or, to damage both the head and the magnetic disk due to the head colliding with the magnetic disk surface because of the repeated thermal asperity. In addition, when the head floating surface and the magnetic disk make contact, the lubricant coated on the magnetic disk surface may adhere to the head floating surface, and the head crash may occur due to the change in the floating amount or the floating position of the head due to the damage caused by the contact between the head and the magnetic disk.

On the other hand, if the floating amount is large, the efficiency of the electromagnetic conversion characteristic deteriorates due to the increase of the magnetic spacing, and there was a possibility of deteriorating the reproduced output, generating the read error, and generating the seek operation error caused by the read error with respect to the servo signal.

In other words, if the floating amount is set relatively small in order to improve the efficiency of the electromagnetic conversion characteristic, there was a possibility of generating the head crash particularly when the inconsistency among the floating amounts of the individual heads is large, and if the floating amount is set relatively large in order to prevent the head crash, the efficiency of the electromagnetic conversion characteristic deteriorated particularly when the inconsistency among the floating amounts of the individual heads is large.

SUMMARY OF THE INVENTION

Accordingly, it is a general object of the present invention to provide a novel and useful head floating amount control method and unit, storage apparatus and computer-readable program, in which the problems described above are suppressed.

Another and more specific object of the present invention is to provide a head floating amount control method, a head floating amount control unit, a storage apparatus and a computer-readable storage medium, which can control the floating amount of the individual head with respect to the recording media to an optimum value.

Still another object of the present invention is to provide a head floating amount control unit for controlling a head floating amount of each of a plurality of heads respectively having a heater, with respect to a recording medium, comprising a detecting part configured to detect contact between each head and a corresponding recording medium by detecting a thermal asperity or a read error, and to judge a heating amount of the heater at a time when the contact is detected as a state where the head floating amount is zero; and a control part configured to control the head floating amount of each head to an optimum head floating amount based on a relationship of the heating amount of the heater and an amount of thermal expansion of each head. According to the head floating amount control unit of the present invention, it is possible to control the floating amount of the individual head with respect to the recording medium to an optimum value.

A further object of the present invention is to provide a storage apparatus comprising a plurality of heads respectively having a heater; a contact detecting part configured to detect a contact between each head and a corresponding recording medium by detecting a thermal asperity or a read error; and a control part configured to control a head floating amount of each head to an optimum head floating amount based on a relationship of a heating amount of the heater and an amount of thermal expansion of each head, regarding the heating amount of the heater at a time when the contact is detected as a state where the head floating amount is zero. According to the storage apparatus of the present invention, it is possible to control the floating amount of the individual head with respect to the recording medium to an optimum value.

Another object of the present invention is to provide a head floating amount control method for controlling a head floating amount of each of a plurality of heads respectively having a heater, with respect to a recording medium, comprising detecting contact between each head and a corresponding recording medium by detecting a thermal asperity or a read error, and judging a heating amount of the heater at a time when the contact is detected as a state where the head floating amount is zero; and controlling the head floating amount of each head to an optimum head floating amount based on a relationship of the heating amount of the heater and an amount of thermal expansion of each head. According to the head floating amount control method of the present invention, it is possible to control the floating amount of the individual head with respect to the recording medium to an optimum value.

Still another object of the present invention is to provide a computer-readable program for causing a computer to control a head floating amount of each of a plurality of heads respectively having a heater, with respect to a recording medium, comprising a procedure causing the computer to detect contact between each head and a corresponding recording medium by detecting a thermal asperity or a read error, and to judge a heating amount of the heater at a time when the contact is detected as a state where the head floating amount is zero; and a procedure causing the computer to control the head floating amount of each head to an optimum head floating amount based on a relationship of the heating amount of the heater and an amount of thermal expansion of each head. According to the computer-readable program of the present invention, it is possible to control the floating amount of the individual head with respect to the recording medium to an optimum value.

Other objects and further features of the present invention will be apparent from the following detailed description when read in conjunction with the accompanying drawings.

BRIEF DESCRIPTION OF THE DRAWINGS

FIG. 14 is a diagram showing a heater power map including heater power setting values at the time when a read request is made;

FIG. 15 is a diagram showing a heater power map including heater power setting values at the time when a write request is made;

FIGS. 17A through 17C are diagrams for explaining an example of a head output read waveform for a case where the head floating amount decreases due to heating by the heater and the head collides with fine projections existing on the magnetic disk; and FIGS. 18A through 18C are diagrams for explaining a distortion in the head output read waveform due to the decrease of the head floating amount and the fine projections.

DESCRIPTION OF THE PREFERRED EMBODIMENTS

Figure 1:
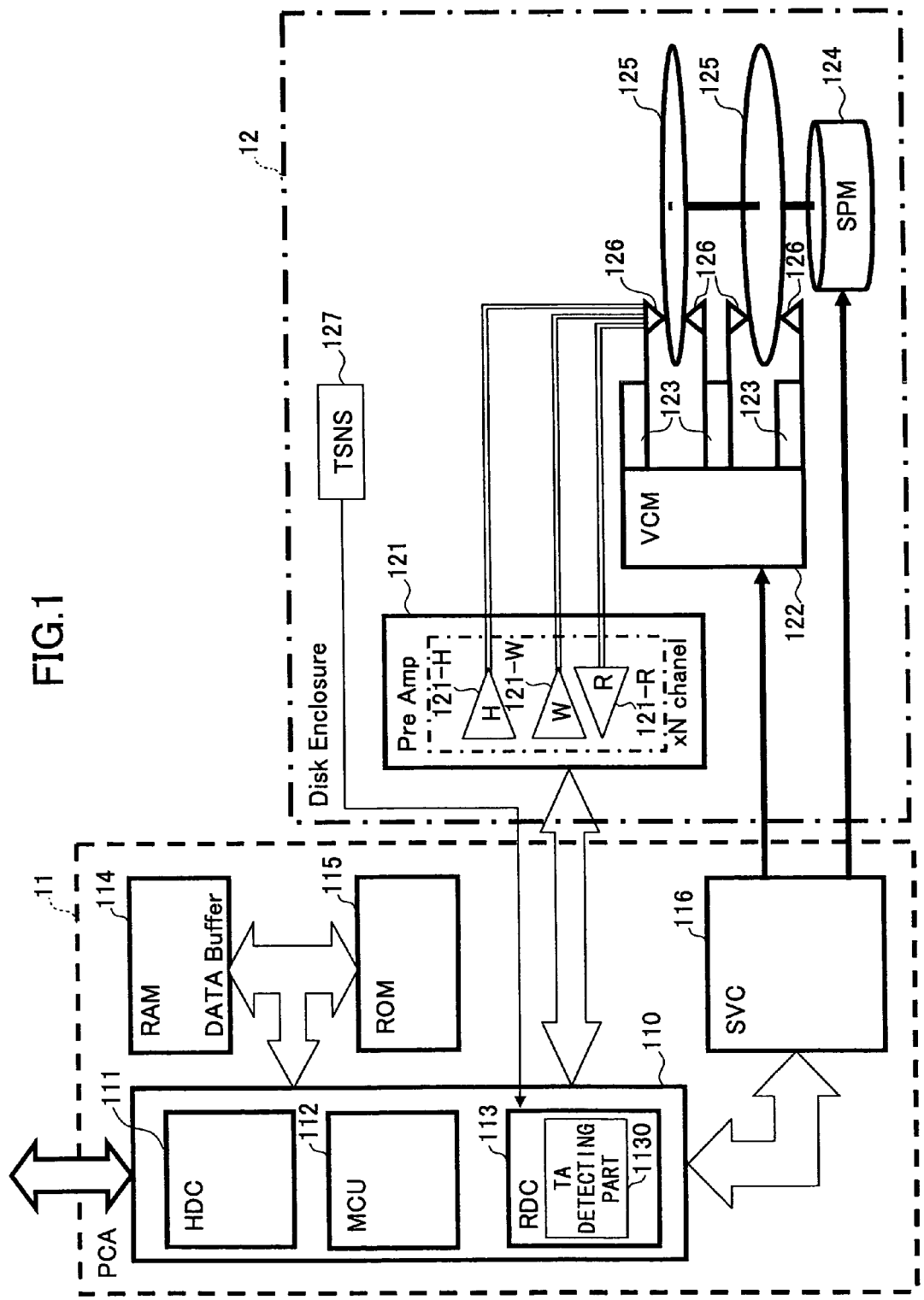
FIG. 1 is a system block diagram showing a basic structure of an embodiment of a storage apparatus according to the present invention.

According to the present invention, in a storage apparatus having a head provided with a heater for heating in a vicinity of a head element, the head is thermally expanded by the heating provided by the heater, and a floating amount of the head element with respect to a recording medium is gradually reduced. In a case where the head element and the recording medium make contact with each other, a thermal transient response is generated in a read signal that is output from the head due to the collision thermal energy at the time of the contact. Generally, this phenomenon is referred to as a thermal asperity. Hence, the contact between the head element and the recording medium is detected by detecting this thermal asperity, and a heating amount of the heater at the time when the thermal asperity is detected is judged as being a state where the floating amount of the head element with respect to the recording medium. Thereafter, the floating amount of each of the individual heads is controlled to an optimum value based on a relationship of the heating amount of the heater and the amount of the thermal expansion. Instead of detecting the thermal asperity, it is also possible to detect the contact between the head element and the recording medium by detecting a read error. The head floating amount is controlled based on heating control parameters such as a heater current that is applied to the heater and the heater power.

In a case where the recording medium is a rotary recording medium such as a disk, the floating amount of each of the individual heads generally differs depending on the radial position on the recording medium. This is because the floating balance of the head changes depending on the rotational speed of the recording medium and the windage loss generated by the rotation of the recording medium. Accordingly, by controlling and optimizing the floating amount of each of the individual heads depending on the position on the recording medium, it is possible to optimize the read performance and the write performance. Furthermore, it is possible to improve the reliability of the storage apparatus by improving the margin until the head crash occurs, which head crash otherwise occurred due to the HDI conventionally caused by the inconsistency among the floating amounts of the individual heads.

Therefore, the present invention controls the floating amount of each of the individual heads to the optimum value, so as to suppress the inconsistency among the floating amounts of the individual heads, and controls the floating amount of each of the individual heads to approximately the same value, so as to stabilize the head output characteristic and to obtain a desired error rate. As a result, the head floating characteristic stabilizes, and it is possible to prevent the head crash that is caused by the decrease in the magnetic spacing of the HDI when the floating amount is relatively small. In addition, since it is possible to prevent the thermal asperity that is caused by the contact between the head and the recording medium, it is also possible to prevent the read error caused by the thermal asperity.

On the other hand, because it is possible to suppress the decrease in the head output caused by the spreading of the magnetic spacing of the HDI when the floating amount of the head is relatively large, it is possible to obtain a stable write characteristic and a stable read characteristic.

The floating amount of the head with respect to the recording medium is in an approximately proportional relationship to a signal-to-noise ratio (SNR) of the read signal. Accordingly, the SNR improves if the floating amount is small, and the improved signal quality of the read signal improves the read margin, that is, improves the read error rate. The SNR decreases if the floating amount is large, and the read error rate deteriorates. Hence, it is possible to improve the read error rate by controlling and optimizing the floating amount of the head depending on the individual head and, if necessary, depending on the position on the recording medium. Moreover, it may be regarded that the effect of preventing the head crash caused by the HDI is obtained since the present invention has the effect of suppressing the individual inconsistency such as a particularly small floating amount of the head. Therefore, the present invention can improve the performance and reliability of the storage apparatus.

Next, a description will be given of each embodiment of a head floating amount control method, a head floating amount control unit, a storage apparatus and a computer-readable program according to the present invention, by referring to the drawings.

FIG. 1 is a system block diagram showing a basic structure of an embodiment of the storage apparatus according to the present invention. In this embodiment, the present invention is applied to an HDD.

As shown in FIG. 1, an HDD 1 has a printed circuit part (PCA) 11 and a disk enclosure (DE) 12. The PCA 11 controls the entire HDD 1 and also controls transmission and reception between the HDD 1 and a host unit (not shown) via a host interface.

The PCA 11 includes a hard disk controller (HDC) 111, a micro control unit (MCU) 112, a read channel (RDC) 113, a random access memory (RAM) 114, a read only memory (ROM) 115, and a servo control circuit (SVC) 116. The HDC 111 carries out an interface protocol control, a data buffer control, a disk format control and the like. The MCU 112 carries out an operation process to control the HDC 111, the RDC 113 and the SVC 116, and to manage memories within the HDD 1 such as the RAM 114 and the ROM 115. The RDC 113 writes data to and reads data from (including data modulation and data demodulation) with respect to magnetic disks 125 that are used as the recording media. The HDC 111, the MCU 112 and the RDC 113 form a control part 110. The RAM 114 stores various data including intermediate data of the operation process carried out by the MCU 112. The ROM 115 stores programs executed by the MCU 112, data and the like. The SVC 116 controls a voice coil motor (VCM) 122 and a spindle motor (SPM) 124 within the DE 12.

The DE 12 includes a preamplifier part 121, the VCM 122, a plurality of actuators 123, the SPM 124, a plurality of magnetic disks 125, a plurality of heads 126, and a temperature sensor (TSNS) 127. For the sake of convenience, FIG. 1 shows a case where two magnetic disks 125 are provided and one pair of heads 126 is provided with respect to each magnetic disk 125. However, the number of magnetic disks 125 and the number of heads 126 are not limited to those shown in FIG. 1, and at least one head 126 may be provided with respect to each of the plurality of magnetic disks 125.

The preamplifier part 121 includes a write driver 121-W for amplifying a write signal and supplying the amplified write signal to the head 126, a read preamplifier 121-R for amplifying a read signal from the head 126, and a heater driver 121-H for driving a heater (not shown) within the head 126, for each of N channels corresponding to the number N of heads 126 that are provided within the DE 12. As will be described later in conjunction with FIG. 2, the preamplifier part 121 further includes a heater control circuit 121A (not shown in FIG. 1). The VCM 122 drives the actuators 123 which support the heads 126. The SPM 124 rotates the magnetic disks 125. As will be described in conjunction with FIG. 2, the head 126 includes a write head for writing (or recording) the write signal with respect to the corresponding magnetic disk 125, a read head for reading the read signal from the corresponding magnetic disk 125, and the heater. For example, the write head is formed by an inductive head, and the read head is formed by an MR head. The temperature sensor 127 detects a temperature within the DE 12, that is, an environment temperature of the HDD 1, and may be formed by a thermistor, for example.

The detection of the contact between the head 126 and the corresponding magnetic disk 125, the calculation of the head floating amount, the calculation of heating control parameters for controlling the heating by the heater of the head 126, the storage of the heating control parameters into the memory within the HDD 1 and the like, which will be described later, are carried out by a firmware program of the MCU 112.

The basic structure shown in FIG. 1 is basically the same as the basic structure of the conventional HDD. However, when compared to the conventional HDD which has the head having no built-in heater, the basic structure shown in FIG. 1 differs from the basic structure of the conventional HDD in that the heater driver 121-H and the heater control circuit 121A are provided in the preamplifier part 121, and the built-in heater of the head 126 is controlled to control the heat generated from the heater.

Figure 2:
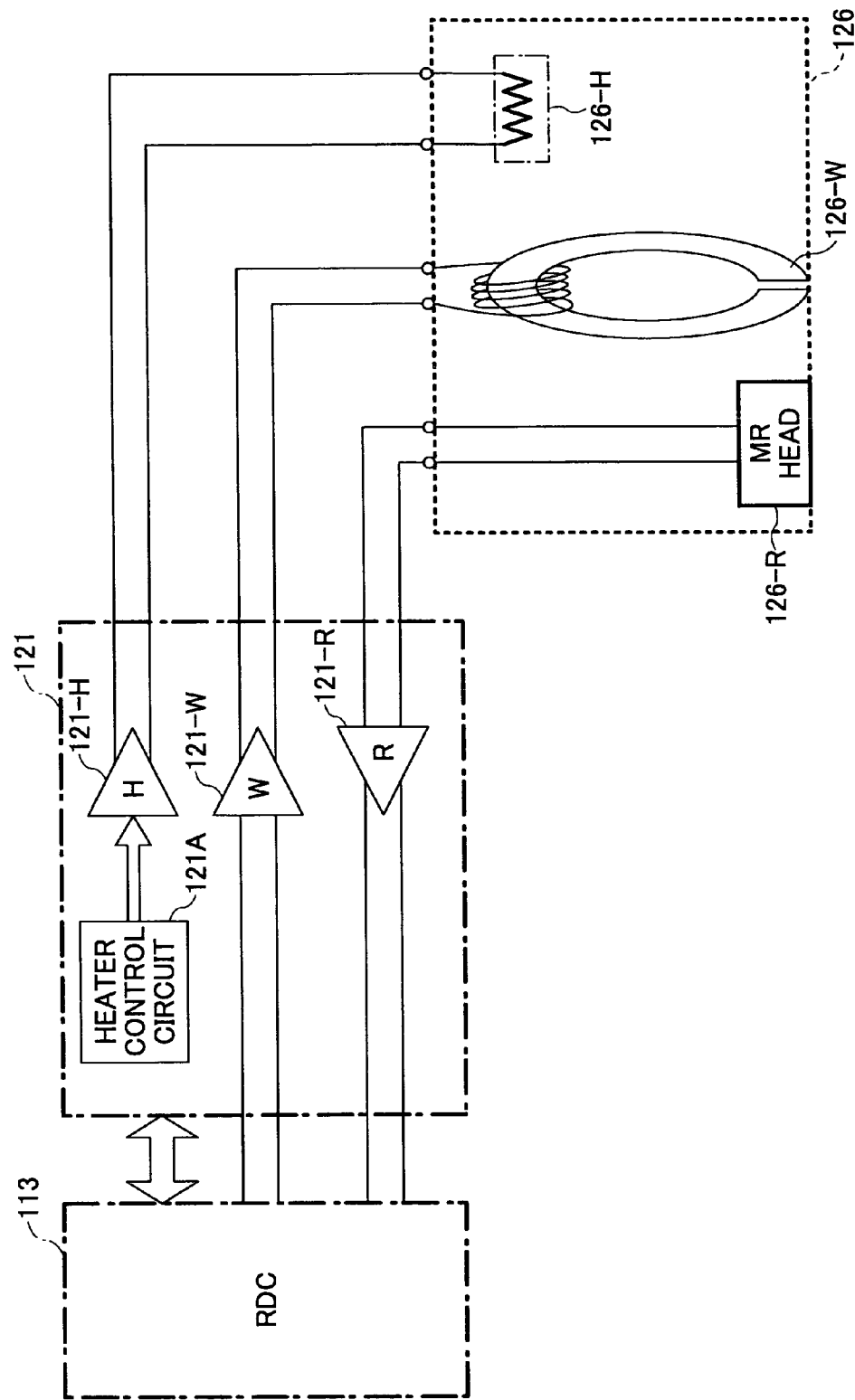
FIG. 2 is a diagram showing a read channel and a preamplifier part together with an internal structure of a head.

FIG. 2 is a diagram showing the RDC 113 and the preamplifier part 121 together with an internal structure of the head 126. As shown in FIG. 2, the heater control circuit 121A is provided within the preamplifier part 121. In addition, the head 126 includes a read head (MR head) 126-R, a write head (inductive head) 126-W, and a heater 126-H. The read signal that is read from the magnetic disk 125 by the read head 126-R is amplified by the read preamplifier 121-R and supplied to the RDC 113. The write head 126-W receives the write signal from the RDC 113 via the write driver 121-W, and writes the write signal on the magnetic disk 125. The heater control circuit 121A controls the heating amount of the heater 126-H via the heater driver 121-H.

Figure 3:
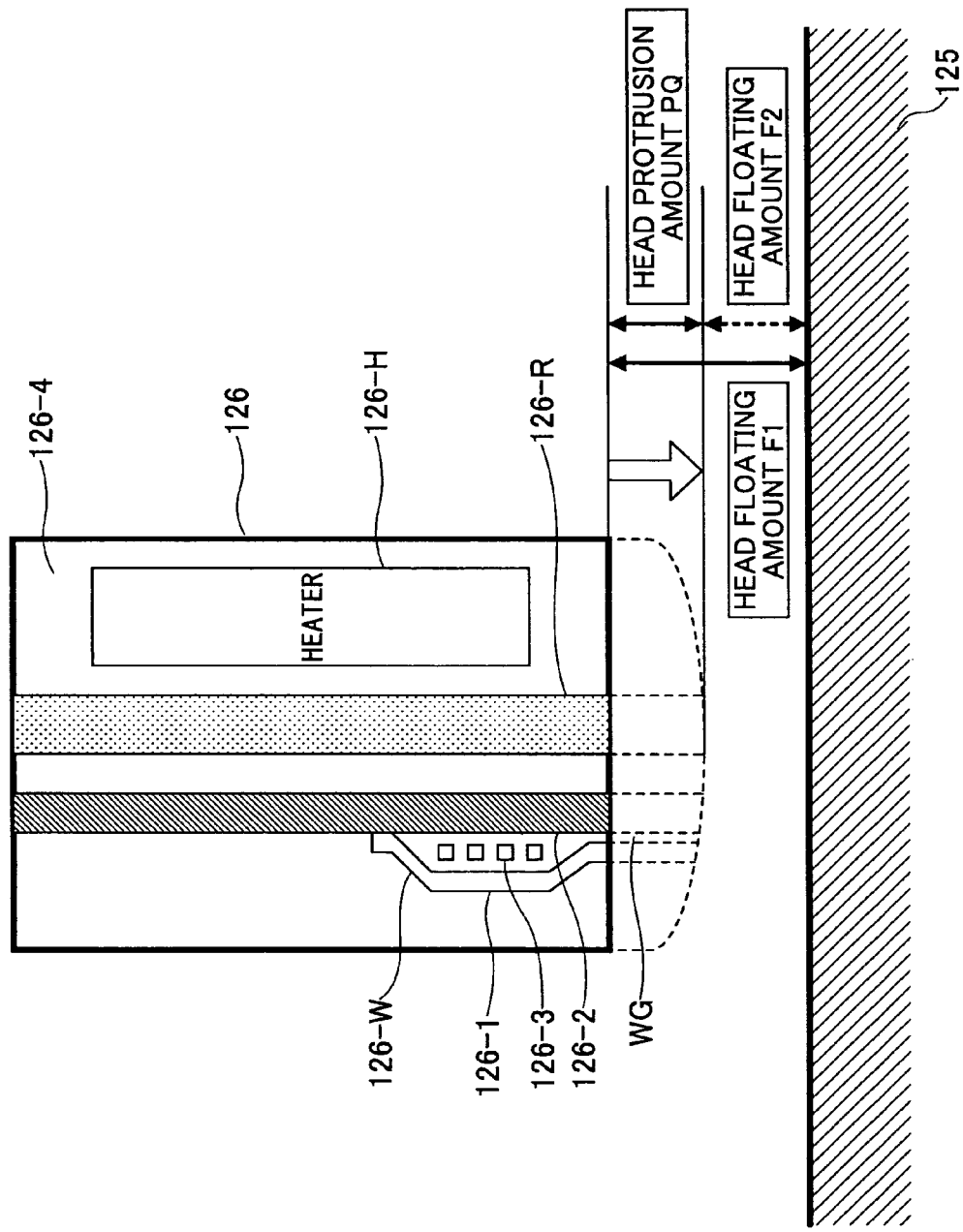
FIG. 3 is a cross sectional view showing an important part of the head.

FIG. 3 is a cross sectional view showing an important part of the head 126. The write head 126-W shown in FIG. 2 has a structure in which a coil 126-3 is wound on an upper magnetic pole 126-1 and a lower magnetic pole 126-2 as shown in FIG. 3. A magnetic field dependent upon the current applied to the coil 126-3 is generated at a write gap WG, so that the write signal may be written on the magnetic disk 125.

The heating amount of the heater 126-H is controlled by the heater current applied thereto. Various parts of the head 126, including a head resin part 126-4, are thermally expanded in a direction indicated by a white arrow in FIG. 3 depending on the heating amount of the heater 126-H. This thermal expansion occurs in a direction (downward direction in FIG. 3) towards the floating surface (lowermost surface in FIG. 3) of the head 126, that is, towards the magnetic disk 125, and the value of this thermal expansion is referred to as a head protrusion amount. The head 126 itself having this structure is known from the Japanese Laid-Open Patent Applications No. 2003-168274, No. 2003-272335, No. 2006-4474 and No. 2006-18987, for example.

Figure 4:
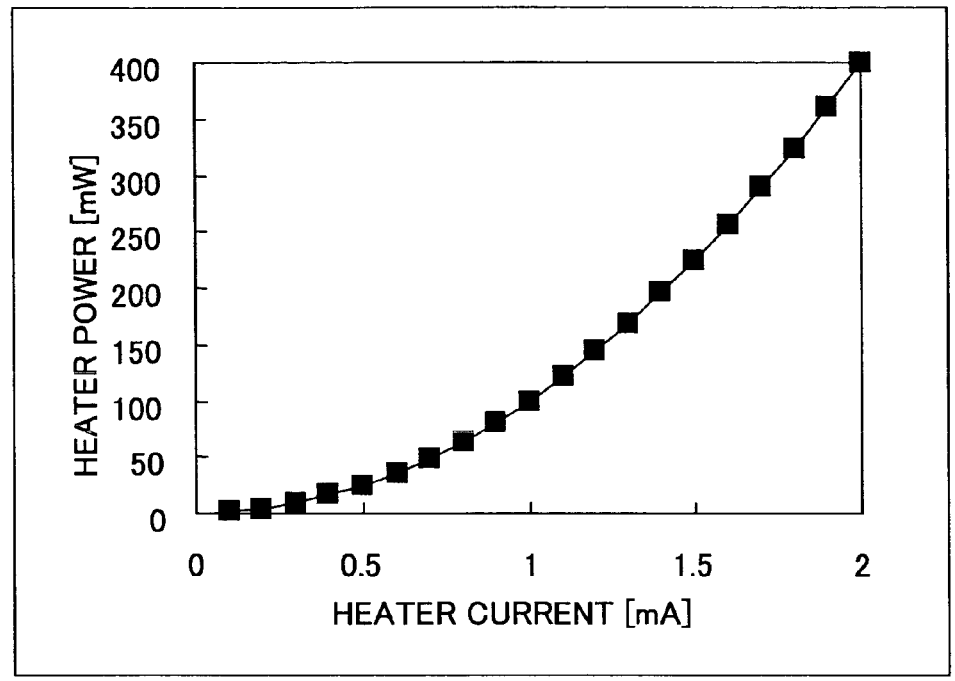
FIG. 4 is a diagram showing a relationship of a heater current and a heater power for a case where a heater resistance is 100 Ω.
Figure 5:
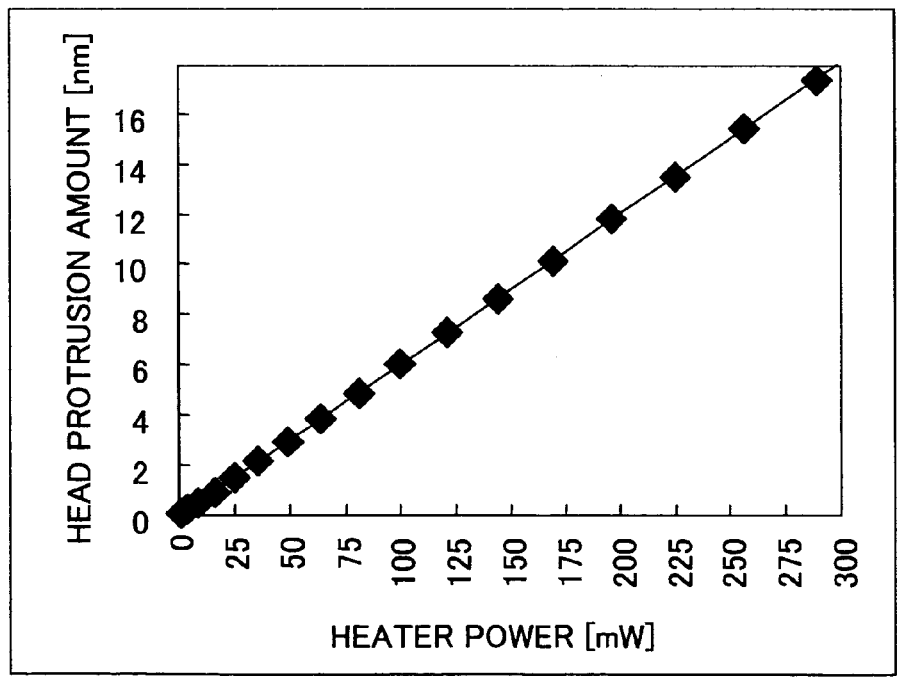
FIG. 5 is a diagram showing a relationship of the heater power and a head protrusion amount.

FIG. 4 is a diagram showing a relationship of the heater current and the heater power for a case where a heater resistance of the heater 126-H is 100 Ω. In addition, FIG. 5 is a diagram showing a relationship of the heater power of the heater 126-H and the head protrusion amount.

As shown in FIG. 3, the floating amount of the head 126 is normally maintained to a head floating amount F1. But by applying the heater current to the heater 126-H, the thermal expansion dependent upon the heater power is generated as indicated by a dotted line in FIG. 3, and a head protrusion amount PQ shown in FIG. 5 changes depending on the heater power. Accordingly, the floating amount of the head 126 decreases by an amount corresponding to the head protrusion amount PQ, and becomes a head floating amount F2 shown in FIG. 3.

Figure 6:
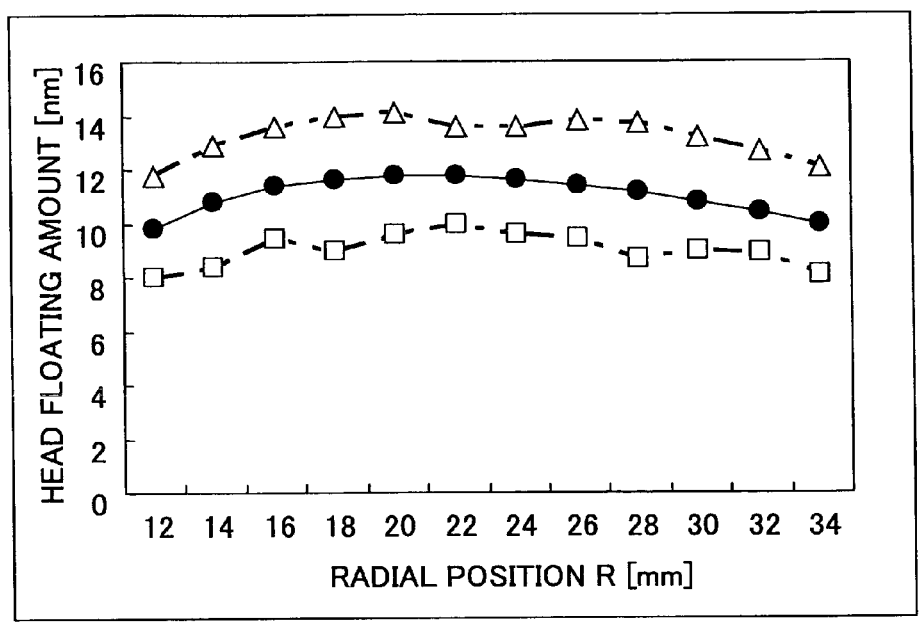
FIG. 6 is a diagram showing examples of heat floating amounts corresponding to radial positions on a magnetic disk.

FIG. 6 is a diagram showing examples of heat floating amounts corresponding to radial positions R on the magnetic disk 125. In FIG. 6, a symbol ● indicates a typical head floating amount, a symbol Δ indicates a maximum head floating amount, and a symbol □ indicates a minimum head floating amount. The head floating amount is not constant with respect to the radial positions R on the magnetic disk 125, and changes as shown in FIG. 6 due to a change in the negative pressure caused by the floating position of the head 126, the windage loss due to wind external disturbance, and the like. In addition, there are inconsistencies in the maximum head floating amount and the minimum head floating amount for each of the individual heads 126 depending on the radial positions R on the corresponding magnetic disk 125, as shown in FIG. 6.

Figure 7:
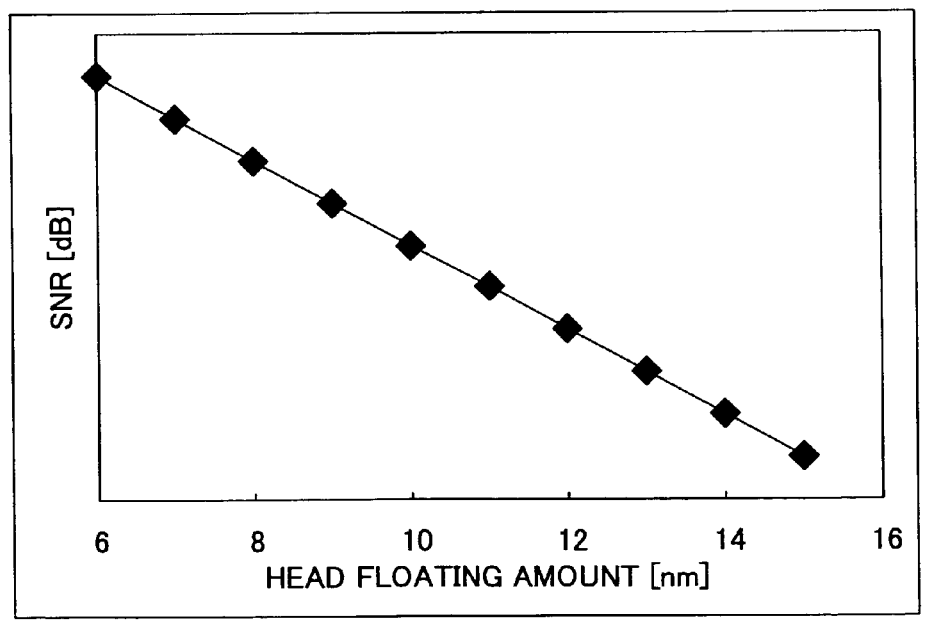
FIG. 7 is a diagram showing a relationship of the head floating amount and a signal-to-noise ratio (SNR) of a read signal that is read by a read head when the heat floating amount changes.

FIG. 7 is a diagram showing a relationship of the head floating amount and the signal-to-noise ratio (SNR) of the read signal that is read by the read head 126-R when the heat floating amount changes. As may be seen from FIG. 7, the SNR decreases as the head floating amount becomes larger, and the SNR improves and the signal quality improves when the head floating amount becomes smaller.

Figure 8:
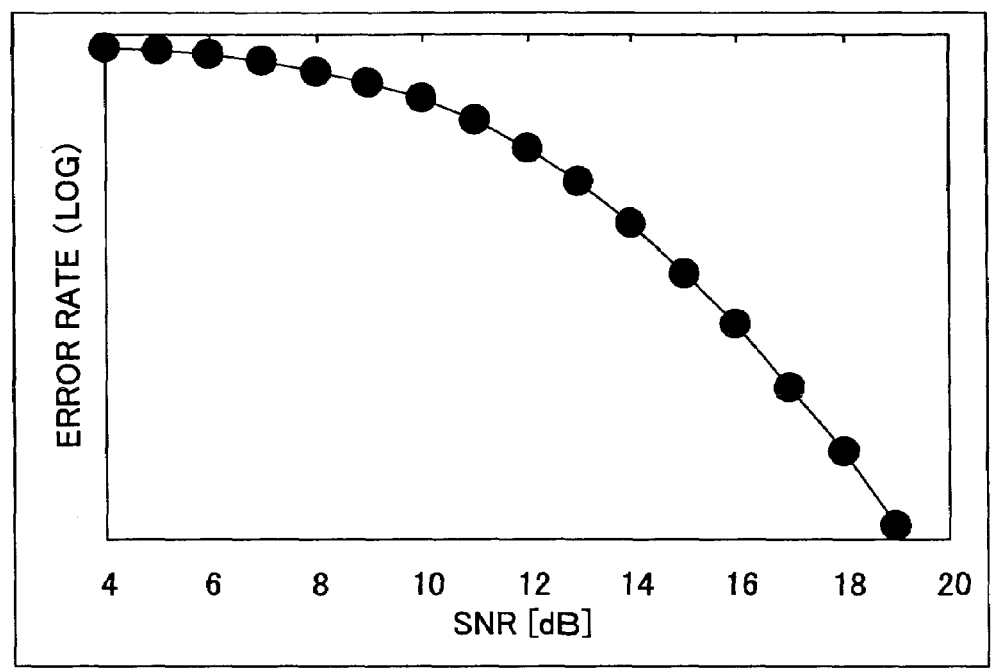
FIG. 8 is a diagram showing a relationship of the SNR and an error rate of the read signal.

FIG. 8 is a diagram showing a relationship of the SNR and the error rate of the read signal. As may be seen from FIG. 8, when the SNR becomes large, that is, the head floating amount becomes smaller, the error rate decreases to thereby decrease the error probability of the read signal (data), and the signal quality improves. On the other hand, when the head floating amount becomes larger, the SNR decreases to thereby increase the error rate, and the error probability of the read signal (data) increases and there is a possibility of deteriorating the signal quality.

Figure 9:
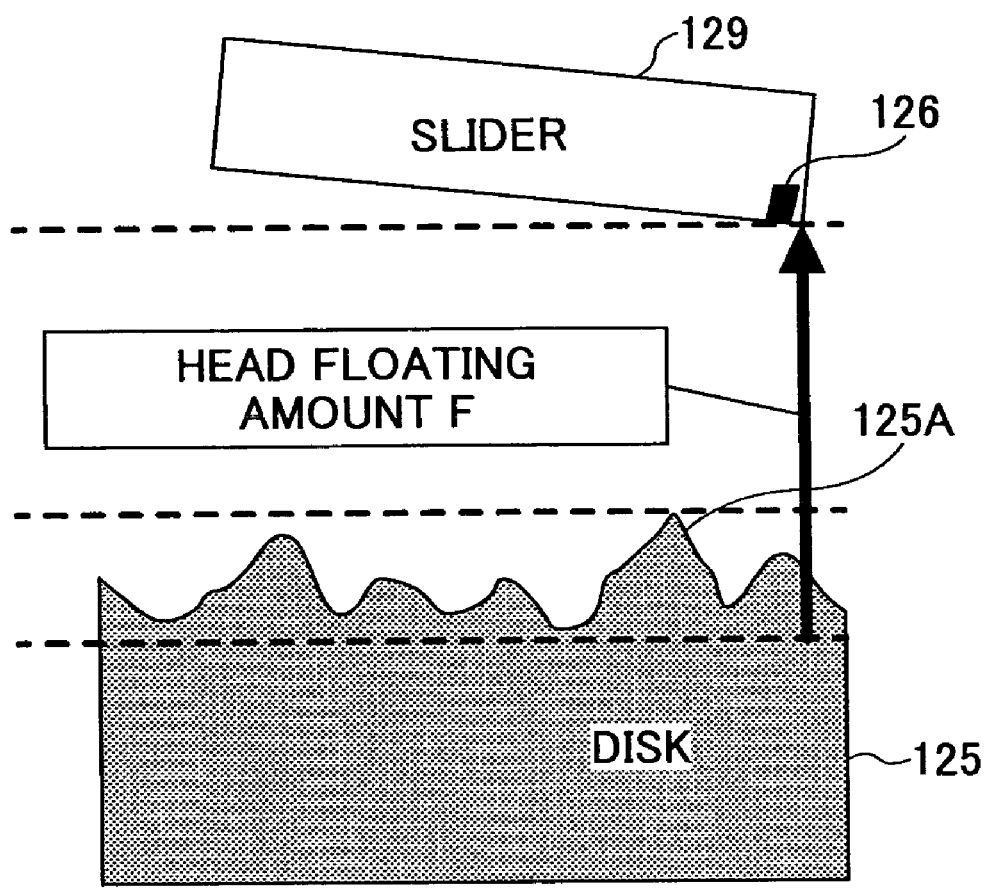
FIG. 9 is a diagram showing a relationship of a slider on which the head is mounted and the magnetic disk.

FIG. 9 is a diagram showing a relationship of a slider 129 on which the head 126 is mounted and the magnetic disk 125. The surface of the magnetic disk 125 is flat when observed on a macro level, but a surface roughness exists as shown in FIG. 9 when observed on a micro level. This surface roughness depends upon the texturing technique, the polishing technique (medium polishing) or the like. The surface roughness shown in FIG. 9 includes fine projections 125A, and when the head floating amount F decreases or, there exist projections that are large compared to the fine projections 125A shown in FIG. 9, the head 126 may collide with the fine projections 125A or with the large projections to thereby generate the thermal asperity.

Figure 10:
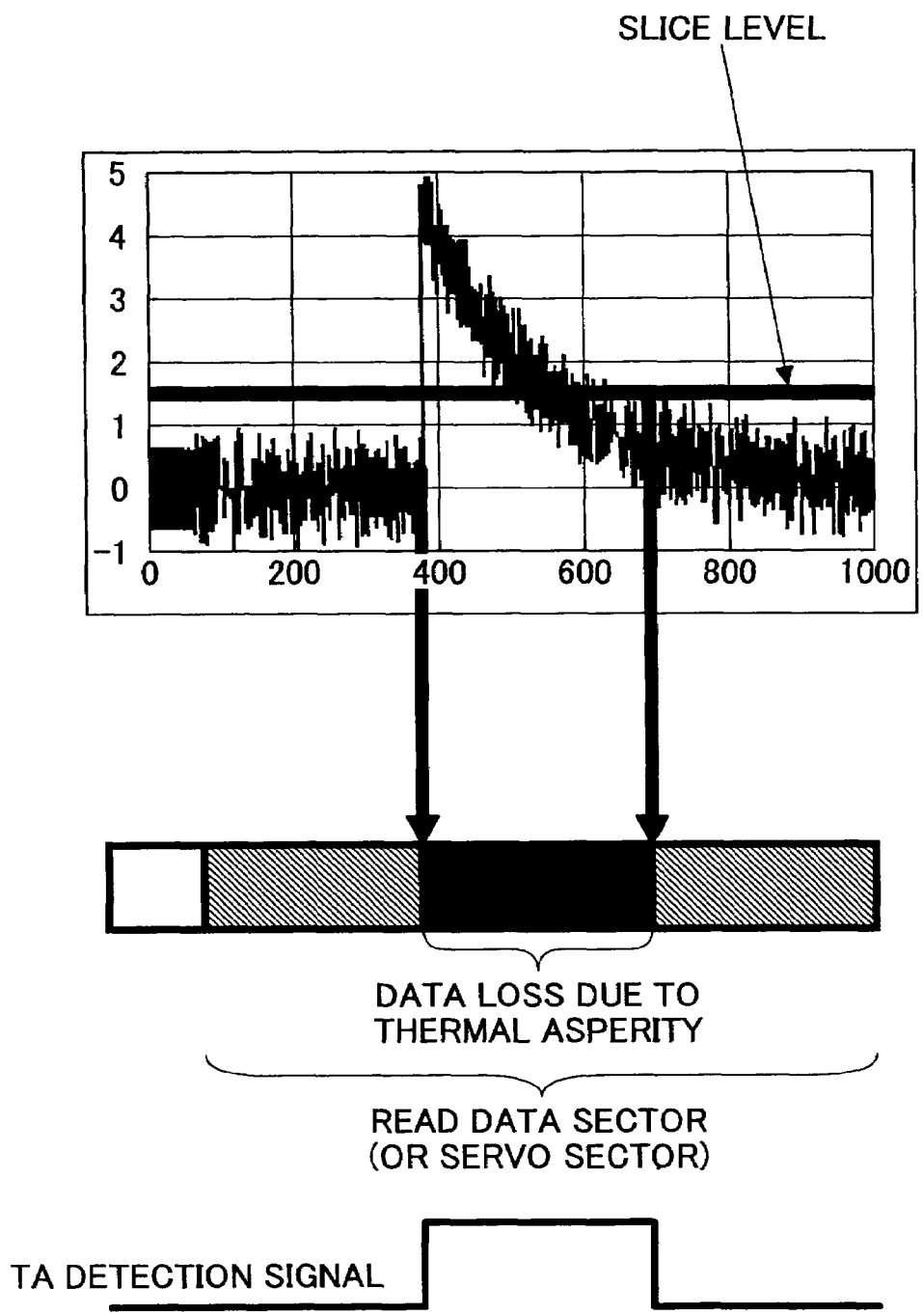
FIG. 10 is a diagram for explaining thermal asperity.

FIG. 10 is a diagram for explaining the thermal asperity. In FIG. 10, a waveform shown in the upper portion indicates the read signal, where the ordinate indicates the amplitude of the read signal in arbitrary units and the abscissa indicates the time in arbitrary units. In addition, a central portion of FIG. 10 shows a data sector (or a servo sector), and a lower portion of FIG. 10 shoes a thermal asperity (TA) detection signal. The resistance of the read head 126-R changes by the thermal response, due to the thermal energy that is generated when the head 126 collides with the fine projection 125A. This thermal response generates a D.C. voltage offset (DC offset) in the read signal shown in FIG. 10, and this DC offset displays a response characteristic that gradually attenuates. The thermal asperity generates a loss of data when the read signal shown in FIG. 10 corresponds to the data sector, and may be detected as the read error. In addition, by providing a slice level shown in FIG. 10, the thermal asperity may be detected using the TA detection signal.

The method itself of detecting the thermal asperity is proposed in the Japanese Laid-Open Patent Application No. 11-185210, for example, and a description thereof will be omitted. In this embodiment, it is assumed that a TA detecting part 1130 within the RDC 113 shown in FIG. 1 detects the thermal asperity by a known method and generates the TA detection signal. The TA detection signal is supplied to the MCU 112 shown in FIG. 1 where the thermal asperity is recognized.

This embodiment positively utilizes the thermal asperity. In other words, the head floating amount is decreased by making the head 126 protrude by the heating provided by the heater 126-H, and a point where the thermal asperity is detected is recognized as a point where the head floating amount is zero. In addition, by calculating the head floating amount from the relationship between the heater power and the head protrusion amount shown in FIG. 5, and setting a target head floating amount with respect to each head 126, it is possible to carry out the read operation and the write operation under a stable floating characteristic. For this reason, even in a case where the head floating amount is small and the head floating amounts of the individual heads 126 are inconsistent, it is possible to prevent the head crash that occurs when the head 126 and the magnetic disk 125 make contact with each other, and it is also possible to prevent the deterioration of the head output characteristic caused by the lubricant that is coated on the magnetic disk 125 and adheres to the head 126 upon contact. Moreover, even in a case where the inconsistency among the head floating amounts of the individual heads 126 is relatively large, it is possible to prevent the deterioration of the write performance caused by the long arrival distance of the magnetic field generated by the write head 126-W, and to prevent the deterioration of the read error rate caused by the decrease in the SNR of the read signal.

Figure 11:
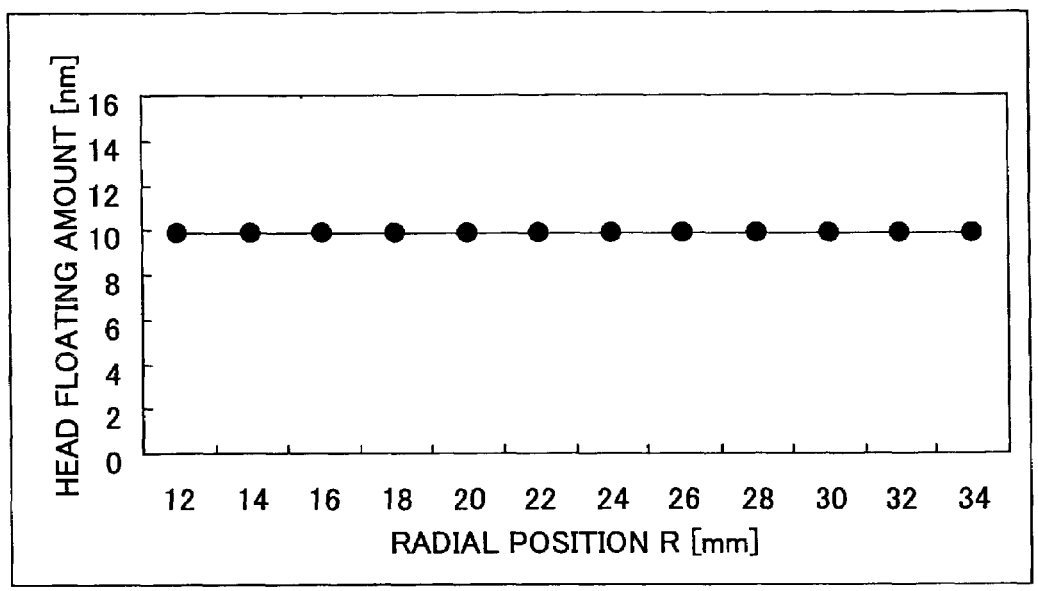
FIG. 11 is a diagram for explaining a case where a target head floating amount is set with respect to each head.

FIG. 11 is a diagram for explaining a case where the target head floating amount is set with respect to each head 126. In FIG. 11, the ordinate indicates the head floating amount of each head 126, and the abscissa indicates the radial position R (distance from the center of the magnetic disk 125) on the corresponding magnetic disk 125. As may be seen from FIG. 11, this embodiment can obtain an approximately constant head floating amount for all of the heads 126, by optimizing the head floating amount of each of the heads 126.

Figure 12:
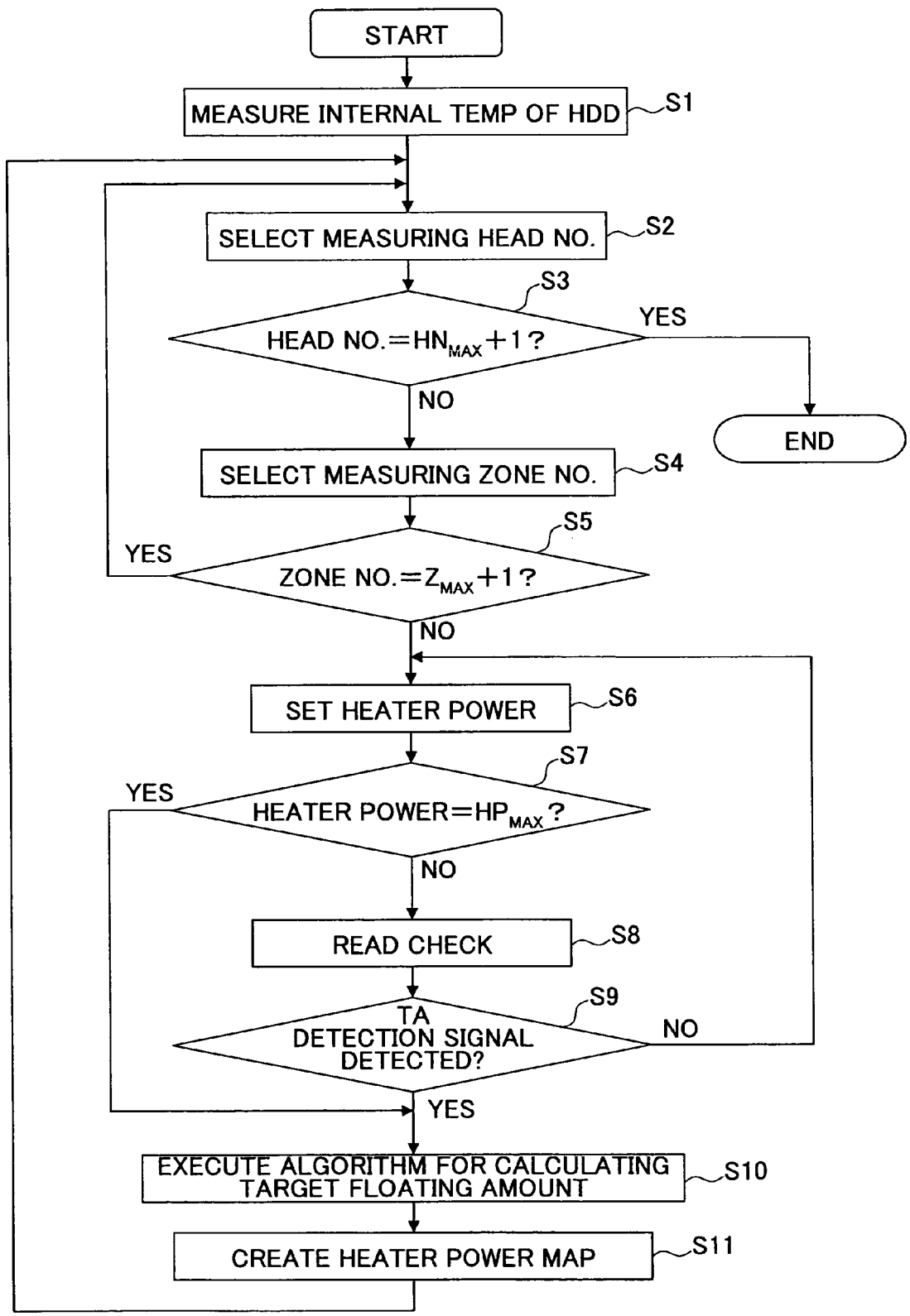
FIG. 12 is a flow chart for explaining an operation of the embodiment.

FIG. 12 is a flow chart for explaining an operation of this embodiment, and corresponds to the operation of this embodiment of the head floating amount control unit according to the present invention, that is, the operation of this embodiment of the head floating amount control method according to the present invention. The process shown in FIG. 12 is carried out by the MCU 112 shown in FIG. 1 which forms the head floating amount control unit, by executing this embodiment of the computer-readable program according to the present invention that is stored in the ROM 115 or the RAM 114, for example. In FIG. 12, the heater power which is to be set to control the head floating amount is obtained for each environment temperature in which the HDD is used (for each internal temperature of the HDD 1), with respect to each head 126 within the HDD 1 and with respect to each region (each zone) on the magnetic disk 125 that is formatted according to the zone bit recording (ZBR) format.

The computer-readable program according to the present invention may be stored in a computer-readable storage medium which stores the computer-readable program in a computer-readable manner. The computer-readable storage medium may be formed by any suitable recording media capable of storing the computer-readable program in a computer-readable manner, such as magnetic recording media, optical recording media, magneto-optical recording media and semiconductor memory devices.

The process shown in FIG. 12 is desirably carried out in a testing process that is carried out before the HDD 1, which is the product, is forwarded from the factory. However, it is of course possible to carry out the process shown in FIG. 12 in an automatic adjustment calibration that is carried out after the HDD 1 is forwarded from the factory. A step S1 measures the internal temperature of the HDD 1 by the temperature sensor 127. For example, the internal temperature of the HDD 1 may be measured at three points, namely, at a high temperature, a room (or normal) temperature and a low temperature. Alternatively, the internal temperature of the HDD 1 may be measured in steps of 5° C. within a temperature range of 0 to 60° C. (that is, in steps of a certain temperature within a predetermined temperature range). A step S2 selects the head 126 for which the measurement is to be made, by specifying the heads 126 in an order starting from the head 126 that is assigned a small head number towards the heads 126 that are assigned larger head numbers, for example. A step S3 decides whether or not the head number is "1" larger than a maximum head number $HN_{max}$ of the head 126 provided within the HDD 1. If the decision result in the step S3 is YES, the process ends because the measurement with respect to all of the heads 126 within the HDD 1 has already been made. In other words, the process shown in FIG. 12 ends when the measurement with respect to all of the heads 126 within the HDD 1 and the measurement with respect to all zones on the magnetic disk 125 have ended.

If the decision result in the step S3 is NO, a step S4 may specify the zone on the magnetic disk 125 to be measured, by specifying the zones in an order starting from the zone that is assigned a small zone number towards the zones that are assigned larger zone numbers, for example. A step S5 decides whether or not the zone number is "1" larger than a maximum zone number $Z_{MAX}$ on the magnetic disk 125, and the process returns to the step S2 if the decision result in the step S5 is YES. If the decision result in the step S5 is NO, a step S6 sets the heater power of the heater 126-H in the heater control circuit 121A. A step S7 decides whether or not the heater power of the heater 126-H is a maximum heater power $HP_{MAX}$, and the process advances to a step S10 which will be described later if the decision result in the step S7 is YES. On the other hand, if the decision result in the step S7 is NO, the process advances to a step S8.

The step S8 carries out a read check by recording test data or the like on the corresponding magnetic disk 125 by the write head 126-W of the head 126 and reading the recorded test data or the like by the read head 126-R of the head 126. A step S9 decides whether or not the TA detection signal, which indicates that the thermal asperity is detected, is generated from the TA detecting part 1130 and detected within the RDC 113. The process returns to the step S6 if the decision result in the step S9 is NO. On the other hand, the process advances to the step S10 if the decision result in the step S9 is YES.

The step S10 executes an algorithm for calculating the target head floating amount. A step S11 creates a heater power map, and the process returns to the step S2. Details of the steps S10 and S11 will be described later in the specification.

The contact between the head 126 and the corresponding magnetic disk 125 may be detected at an arbitrary measuring region on the magnetic disk 125. However, when the damage, such as scratches that may be generated on the head 126 and/or the magnetic disk 125 upon contact between the head 126 and the magnetic disk 125, is taken into consideration, it is preferable that the measuring region on the magnetic disk 125 is not used for the normal read and write. It is possible to utilize a portion of a system area (SA) on the magnetic disk 125, as a region which is not used for the normal read and write. When utilizing a portion of the system area as the measuring region, the heating control parameters for each zone of the magnetic disk 125 are obtained by calculation. When providing the measuring region for each zone, it is possible to utilize a portion such as the inner peripheral portion or the outer peripheral portion of each zone as the measuring region.

Figure 13:
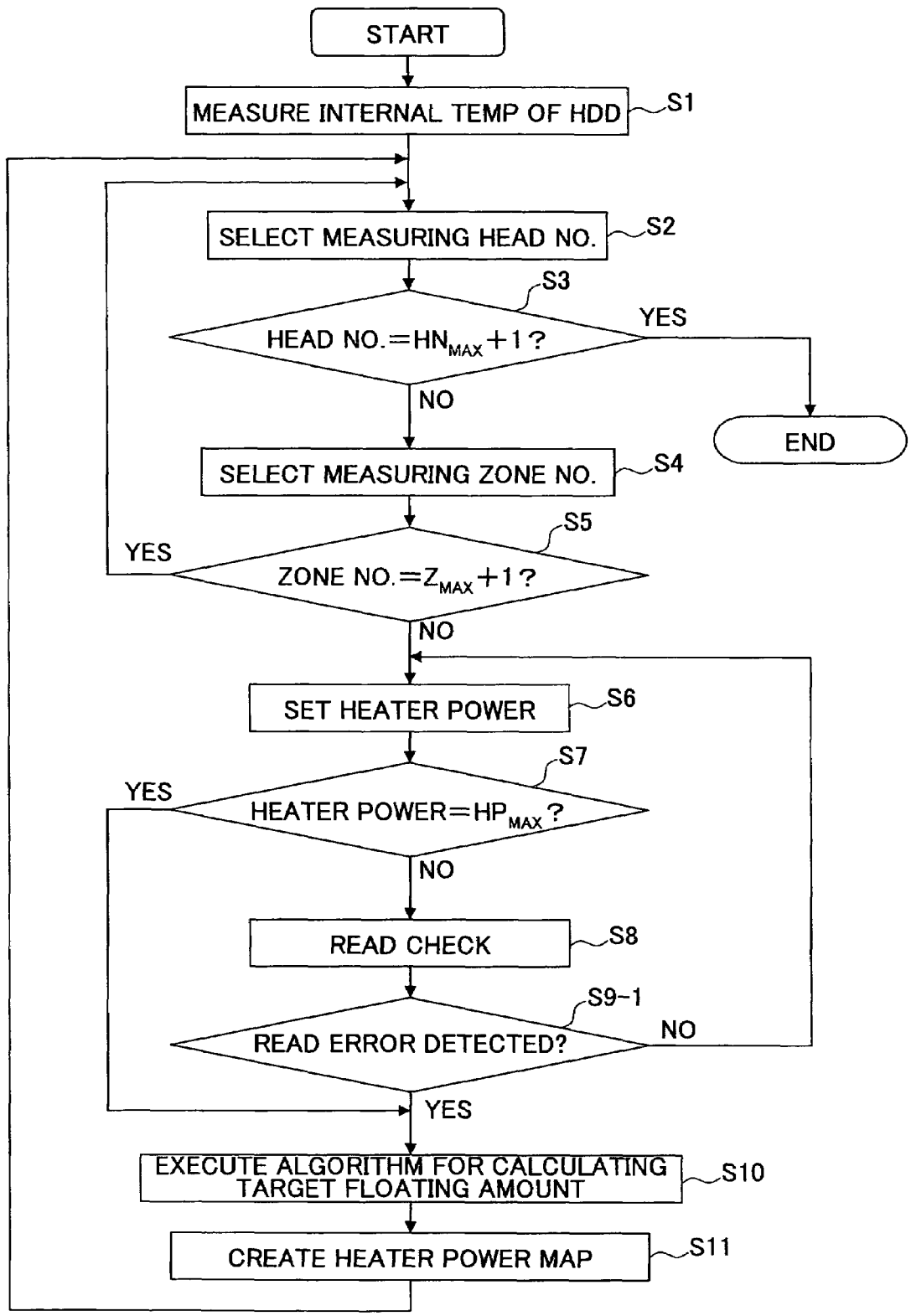
FIG. 13 is a flow chart for explaining an operation of a modification of the embodiment.

FIG. 13 is a flow chart for explaining an operation of a modification of this embodiment. In FIG. 13, those steps that are the same as those corresponding steps in FIG. 12 are designated by the same reference numerals, and a description thereof will be omitted. In FIG. 13, a step S9-1 is carried out in place of the step S9 shown in FIG. 12. The step S9-1 decides whether or not a read error is detected, and the process returns to the step S6 if the decision result in the step S9-1 is NO. On the other hand, if the decision result in the step S9-1 is YES, the process advances to the step S10. When the head 126 makes contact with the fine projection 125A on the magnetic disk 125, a read error is generated and the decision result in the step S9-1 becomes YES. In other words, the detection of the read error is made by the MCU 112.

Next, a description will be given of the algorithm for calculating the target head floating amount, which is executed in the step S10 shown in FIGS. 12 and 13, and the heater power map which is created in the step S11 shown in FIGS. 12 and 13.

As shown in FIG. 5, a relationship between a heater power $\alpha$ and a head protrusion amount $\beta$ may be described by the following approximation formula (1).

$$\beta = 0.06 \times \alpha - 2^{-15} \quad (1)$$

When the TA detection signal is detected in the step S9 shown in FIG. 12 or, the read error is detected in the step S9-1 shown in FIG. 13, it may be judged that the head floating amount is zero. Accordingly, a difference between the head protrusion amount $\beta$ at the time when the head floating amount is zero and the target heat floating amount may be obtained by a back calculation of the formula (1), based on the following formula (2). In other words, if the target floating amount is denoted by $\gamma$, the following formula (2) stands, and the heater power $\alpha$ that is to be set can be obtained from the formula (2).

$$\alpha = [(\beta - \gamma) + 2^{-15}]/0.06 \quad (2)$$

The heater current that is to be actually set may be obtained from the relationship shown in FIG. 4. For example, when the heater power $\alpha = 200$ mW, the head protrusion amount $\beta$ is 12 nm. In the case where the head floating amount is judged as being zero, if the heat floating amount $\gamma$ is to be set to 10 nm, it may be seen from the formula (2) that the heater power $\alpha$ needs to be set to 33 mW. In this case, the HDD 1 is used with the heater power $\alpha$ set to 33 mW and the head protrusion amount $\beta$ of 2 nm.

FIG. 14 is a diagram showing a heater power map including heater power setting values that are obtained in the above described manner at the time when a read request is made, and FIG. 15 is a diagram showing a heater power map including heater power setting values that are obtained in the above described manner at the time when a write request is made. The heater power map stores heater powers $\alpha 00$ through $\alpha nm$ that are obtained with respect to each of the head numbers "0" through "n" and each of the zone numbers "0" through "m", and is created with respect to each internal temperature of the HDD 1 measured in the step S1 shown in FIGS. 12 and 13. The heater power map may be recorded in a predetermined region on the magnetic disk 125 or, recorded in a nonvolatile memory within the HDD 1 such as the ROM 115.

At the time when the write request is made, the head 126 also generates heat due to the write current that is applied to the write head 126-W. Accordingly, the heater power at the time when the write request is made is desirably corrected by taking into consideration the amount of heat generated by the head 126 when the write current is applied to the write head 126-W, by subtracting the amount of heat generated due to the applied write current from the heater power at the time when the read request is made. Hence, in FIG. 15, the heater power map stores corrected heater powers $\alpha 00'$ through $\alpha nm'$ that are corrected in the above described manner.

When the HDD 1 receives an access request from the host unit requesting access to a certain zone of a certain magnetic disk 125 using a certain head 126, the HDD 1 sets the heater power using the heater power map shown in FIG. 14 or 15 depending on the internal temperature of the HDD 1, and sets the floating amount of the head 126 to the target head floating amount which is the optimum amount.

Instead of using all of the zones of the magnetic disk 125 as the measuring target, it is of course possible to use only specific zones of the magnetic disk 125 as the measuring target. In this case, the measured result for the specific zone that is used as the measuring target may be used with respect to the other zones. But desirably, the measured result for the specific zone is corrected using the floating profile of the head floating amount with respect to the radial position R shown in FIG. 6 before being used with respect to the other zones or, the measured result for the specific zone is used for a calculation to obtain values with respect to the other zones.

Furthermore, instead of using the heater power map that stores the heater powers as the heating control parameters for controlling the heating of the heater, it is of course possible to use a heater current map that stores heater currents to be applied to the heater 126-H for each of the head numbers and each of the zone numbers as the heating control parameters.

Figure 16:
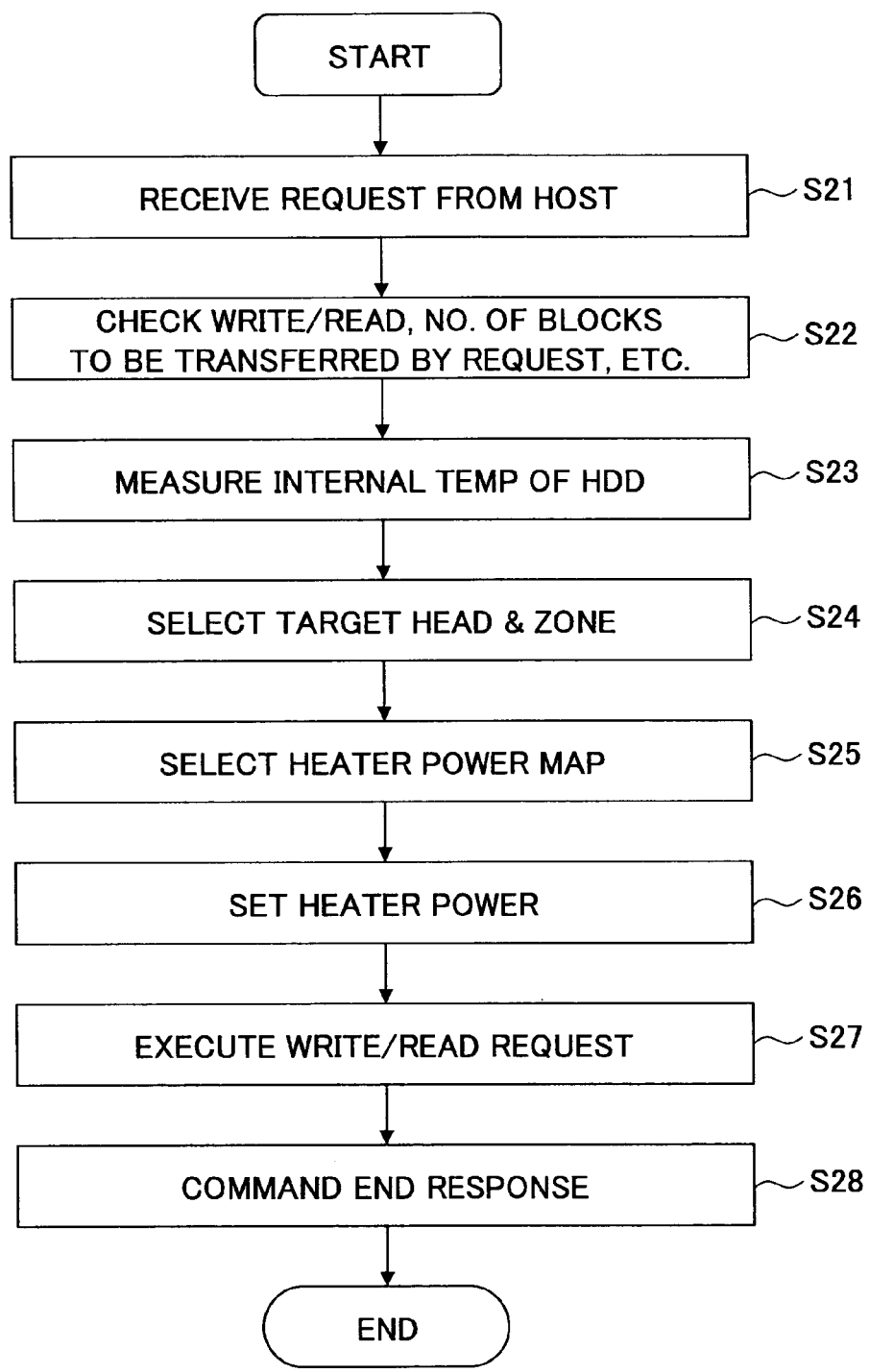
FIG. 16 is a flow chart for explaining an operation of an HDD using the heater power map.

FIG. 16 is a flow chart for explaining an operation of the HDD 1 using the heater power map, and corresponds to an operation of another embodiment of the head floating amount control unit according to the present invention, that is, an operation of another embodiment of the head floating amount control method according to the present invention. The process shown in FIG. 16 is carried out by the MCU 112 shown in FIG. 1 which forms the head floating amount control unit, by executing another embodiment of the computer-readable program according to the present invention that is stored in the ROM 115 or the RAM 114, for example.

In FIG. 16, a step S21 receives a request (or command) from the host unit via the host interface. A step S22 checks whether the received request is a write request or a read request, together with contents of the request such as the number of blocks to be transferred according to the request. A step S23 measures the internal temperature of the HDD 1 by the temperature sensor 127. A step S24 selects the head to be used for the access and the zone of the magnetic disk 125 to be accessed, based on the contents of the request checked by the step S22. A step S25 selects a heater power map corresponding to the internal temperature measured by the step S23, and reads the selected heater power map from the magnetic disk 125 or from the memory within the HDD 1 such as the ROM 115. A step S26 reads the heater power with respect to the head 126 and the zone selected by the step S24, from the heater power map selected by the step S25, and controls the heating amount of the heater 126-H of the selected head 126 via the heater control circuit 121A to an optimum value based on the read heater power. A step S27 executes the received write request or read request. Hence, when a predetermined time elapses after the power is supplied to the heater 126-H, the read operation is carried out if the read request is executed and the write operation is carried out if the write request is executed. A step S28 returns a command end response to the host unit via the host interface, and the process ends.

Therefore, the read based on the read request or, the write based on the write request, is carried out in a state where the heat floating amount of the head 126 corresponding to each magnetic disk 125 that is used for the access is optimized for each zone of the magnetic disk 125 depending on the environmental temperature of the HDD 1.

The read based on the read request or, the write based on the write request, may be carried out in a state where the heat floating amount of the head 126 corresponding to each magnetic disk 125 that is used for the access is optimized depending on the environmental temperature of the HDD 1 or, depending on each zone of the magnetic disk 125.

FIGS. 17A through 17C are diagrams for explaining an example of a head output read waveform for a case where the heat floating amount decreases due to the heating by the heater 126-H and the head 126 collides with the fine projections 125A existing on the magnetic disk 125. FIG. 17A shows the waveform of the read signal (head output read waveform) that is read from the magnetic disk 125 by the head 126, and a read gate signal which is generated by a known method within the RDC 113 and is used to extract servo information and data from the head output read waveform. FIG. 17B shows portions of a servo frame and a data sector of the head output read waveform on an enlarged scale. FIG. 17C shows a data loss within the data sector generated due to the fine projection 125A.

The fine projection 125A shown in FIG. 9 exists at a plurality of locations on the magnetic disk 125, and the height of the fine projections 125A is inconsistent. FIGS. 17A through 17C show a case where the height of the fine projections 125A to which the head 126 collides are relatively high.

The read signal waveform shown in FIG. 10 is for the case where the head 126 collides on a particularly large projection on the magnetic disk 125, and normally, such a large projection does not exist on the magnetic disk 125 in large numbers. Accordingly, although the amplitude of the head output read waveform shown in FIG. 17A is slightly large, this amplitude is not greatly different from the amplitude of the head output read waveform in a normal state where the head 126 does not collide with the projection on the magnetic disk 125. Consequently, it is difficult to detect the contact between the head 126 and the fine projection 125A on the magnetic disk 125 with a high accuracy using the slice level shown in FIG. 10.

Accordingly, when detecting the contact between the head 126 and the fine projection 125A on the magnetic disk 125 with a higher accuracy, the step S9-1 shown in FIG. 13 is carried out in place of the step S9 shown in FIG. 12, so as to check whether or not the read error exists. In the read check carried out in the step S8, the error checking and correction (ECC) function (for example, the on the fly ECC function) is normally made valid, but instead, it is possible to intentionally reduce the correction capability of the ECC function. For example, if the correction capability is 20 bytes, it is impossible to detect the error in 20 or less bytes. Hence, the correction capability may be set as close as possible to 0 byte. In addition, when the correction capability is reduced in steps in the process of carrying out the read check and the read error is detected at a predetermined correction capability, it is possible to provide an algorithm for judging that this read error is caused by the contact between the head 126 and the fine projection 125A on the magnetic disk 125.

FIGS. 18A through 18C are diagrams for explaining a distortion in the head output read waveform due to the decrease of the head floating amount and the fine projections 125A. FIG. 18A shows the normal read signal waveform (head output read waveform) that is read from the magnetic disk 125 by the head 126 in a state where the head 126 does not make contact with the magnetic disk 125. FIG. 18B shows the read signal waveform (head output read waveform) that is read from the magnetic disk 125 by the head 126 in a state where the heat floating amount decreases due to the heating of the heater 125-H and the head 126 makes contact with the fine projection 125A on the magnetic disk 125. FIG. 18C shows a data loss within the data sector generated due to the fine projection 125A.

The fine projection 125A exist in large numbers on the magnetic disk 125, and waveform distortions are generated thereby in the head output read waveform. The data losses in the data sector are generated by these waveform distortions. FIG. 18C shows Nth to (N+3)th sectors, and the data loss is generated at one or two locations within each sector. The data loss may be correctable by the ECC function described above, but are non-correctable in many cases. However, by taking into consideration the cases where the data losses are correctable and "reducing the correction capability" beforehand or "reducing the correction capability in steps" when making the read check, it is possible to judge that the read error detected by a predetermined correction capability is caused by the contact between the head 126 and the fine projection 125A on the magnetic disk 125.

When the recording density of the HDDs further improves in the future, further improved head output characteristic will be demanded. In order to further improve the head output characteristic, it is a precondition that a desired SNR is secured, but the SNR is approximately proportional to the head floating amount of the head with respect to the magnetic disk. For this reason, the present invention which can control the head floating amount in the HDD to an optimum value is effective in making such further improvements in the head output characteristic, and the present invention can provide HDDs having a higher reliability.

This application claims the benefit of a Japanese Patent Application No. 2006-140450 filed May 19, 2006, in the Japanese Patent Office, the disclosure of which is hereby incorporated by reference.

Further, the present invention is not limited to these embodiments, but various variations and modifications may be made without departing from the scope of the present invention.

What is claimed is:

1. A head floating amount control unit for controlling a head floating amount of each of a plurality of heads respectively having a heater, with respect to a recording medium, comprising:
a detecting part configured to detect contact between each head and a corresponding recording medium by detecting a thermal asperity or a read error, and to judge a heating amount of the heater at a time when the contact is detected as a state where the head floating amount is zero; and
a control part configured to control the head floating amount of each head to an optimum head floating amount based on a relationship of the heating amount of the heater and an amount of thermal expansion of each head,
wherein the thermal asperity is detected from a comparison of a read signal and a threshold value, wherein the read error occurs when a data loss is non-correctable.

2. The head floating amount control unit as claimed in claim 1, wherein said control part controls the head floating amount of each head to the optimum head floating amount based on heating control parameters including a heater current to be applied to the heater or a heater power of the heater.

3. The head floating amount control unit as claimed in claim 2, wherein the heating control parameters are stored on the recording medium or, in a memory within a storage apparatus which has the head and the recording medium.

4. The head floating amount control unit as claimed in claim 3, wherein the heating control parameters are stored for each environmental temperature of the storage apparatus.

5. The head floating amount control unit as claimed in claim 4, wherein said heating control parameters comprise a heater power map including heater power setting values that are obtained when one of a read request or write request occurs.

6. The head floating amount control unit as claimed in claim 4, wherein said heating control parameters comprise a heater current map including heater current setting values that are obtained when one of a read request or write request occurs.

7. The head floating amount control unit as claimed in claim 6, wherein said heater current values are determined for each respective head and a location of said respective head in said storage apparatus.

8. The floating amount control unit as claimed in claim 3, wherein the heating control parameters are stored during a testing process that is carried out before the storage apparatus is forwarded or, when carrying out an automatic adjustment calibration after the storage apparatus is forwarded.

9. The head floating amount control unit as claimed in claim 2, wherein the heating control parameters are stored for each region of the recording medium.

10. A storage apparatus comprising:
a plurality of heads respectively having a heater;
a contact detecting pan configured to detect a contact between each head and a corresponding recording medium by detecting a thermal asperity or a read error; and
a control pad configured to control a head floating amount of each head to an optimum head floating amount based on a relationship of a heating amount of the heater and an amount of thermal expansion of each head, regarding the heating amount of the heater at a time when the contact is detected as a state where the head floating amount is zero,
wherein the thermal asperity is detected from a comparison of a read signal and a threshold value,
wherein the read error occurs when a data loss is non-correctable.

11. The storage apparatus as claimed in claim 10, wherein said control pan controls the head floating amount of each head to the optimum bead floating amount based on heating control parameters including a heater current to be applied to the heater or a heater power of the heater.

12. The storage apparatus as claimed in claim 11, wherein the heating control parameters are stored on the recording medium or, in a memory within the storage apparatus.

13. The storage apparatus as claimed in claim 12, wherein the heating control parameters are stored during a testing process that is carried out before the storage apparatus is forwarded or, when carrying out an automatic adjustment calibration after the storage apparatus is forwarded.

14. The storage apparatus as claimed in claim 11, wherein the heating control parameters are one of stored for each region of the recording medium and stored for each environment temperature of the storage apparatus, stored for each region of the recording medium, and stored for each environment temperature of the storage apparatus.

15. The storage apparatus as claimed in claim 14, wherein said heating control parameters comprise a heater power map including heater power setting values that are obtained when one of a read request or write request occurs.

16. The storage apparatus as claimed in claim 14, wherein said heating control parameters comprise a heater current map including heater current setting values that are obtained when one of a read request or write request occurs.

17. A head floating amount control method for controlling a head floating amount of each of a plurality of heads respectively having a heater, with respect to a recording medium, comprising:
detecting contact between each head and a corresponding recording medium by detecting a thermal asperity or a read error, and judging a heating amount of the heater at a time when the contact is detected as a state where the head floating amount is zero; and
controlling the head floating amount of each head to an optimum head floating amount based on a relationship of the heating amount of the heater and an amount of thermal expansion of each head,
wherein the thermal asperity is detected from a comparison of a read signal and a threshold value,
wherein the read error occurs when a data loss is non-correctable.

18. A computer-readable program for causing a computer to control a head floating amount of each of a plurality of heads respectively having a heater, with respect to a recording medium, comprising:
a procedure causing the computer to detect contact between each head and a corresponding recording medium by detecting a thermal asperity or a read error, and to judge a heating amount of the heater at a time when the contact is detected as a state where the head floating amount is zero; and
a procedure causing the computer to control the head floating amount of each head to an optimum head floating amount based on a relationship of the heating amount of the heater and an amount of thermal expansion of each head,
wherein the thermal asperity is detected from a comparison of a read signal and a threshold value,
wherein the read error occurs when a data loss is non-correctable.

19. A computer-readable storage medium which stores a computer-readable program as claimed in claim 18.

20. A head floating amount control unit for controlling a head floating amount of each of a plurality of heads respectively having a heater, with respect to a recording medium, comprising:
a detecting part configured to detect contact between each head and a corresponding recording medium by detecting a thermal asperity or a read error, and to judge a heating amount of the heater at a time when the contact is detected as a state where the head floating amount is zero; and
a control part configured to control the head floating amount of each head to an optimum head floating amount based on a relationship of the heating amount of the heater and an amount of thermal expansion of each head, wherein said control part controls the head floating amount of each head to the optimum head floating amount based on heating control parameters including a heater current to be applied to the heater or a heater power of the heater, wherein the heating control parameters are stored on the recording medium or, in a memory within a storage apparatus which has the head and the recording medium, wherein the heating control parameters are stored for each environmental temperature of the storage apparatus, wherein said heating control parameters comprise a heater power map including heater power selling values that are obtained when one of a read request or write request occurs, wherein when a write request occurs, the heater power setting values are corrected according to an amount of heat generated by a respective head when a write current is applied to said respective head.

* * * * *